United States Patent
Sakamoto et al.

(10) Patent No.: US 7,124,109 B2
(45) Date of Patent: Oct. 17, 2006

(54) POINT SERVICE SYSTEM

(75) Inventors: Kiyomi Sakamoto, Ikoma (JP); Teruaki Ata, Osaka (JP); Atsushi Yamashita, Osaka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 530 days.

(21) Appl. No.: 09/984,806

(22) Filed: Oct. 31, 2001

(65) Prior Publication Data

US 2002/0052830 A1    May 2, 2002

(30) Foreign Application Priority Data

Nov. 1, 2000 (JP) ............ 2000-334856

(51) Int. Cl.
*G06Q 40/00* (2006.01)

(52) U.S. Cl. ................................ 705/37; 705/35
(58) Field of Classification Search .............. 705/35, 705/37

See application file for complete search history.

(56) References Cited

U.S. PATENT DOCUMENTS

| | | | |
|---|---|---|---|
| 5,287,268 A * | 2/1994 | McCarthy | 705/14 |
| 5,734,838 A * | 3/1998 | Robinson et al. | 705/14 |
| 5,774,870 A * | 6/1998 | Storey | 705/14 |
| 6,594,640 B1 * | 7/2003 | Postrel | 705/14 |
| 2001/0054003 A1 * | 12/2001 | Chien et al. | 705/14 |
| 2002/0082849 A1 * | 6/2002 | Tenorio | 705/1 |
| 2003/0050831 A1 * | 3/2003 | Klayh | 705/14 |
| 2004/0078273 A1 * | 4/2004 | Loeb et al. | 705/26 |

FOREIGN PATENT DOCUMENTS

| | | |
|---|---|---|
| JP | 5-143866 | 6/1993 |
| JP | 6-139258 | 5/1994 |
| JP | 6-295390 | 10/1994 |
| JP | 7-272123 | 10/1995 |
| JP | 11-191183 | 7/1999 |
| JP | 2000-268094 | 9/2000 |
| JP | 2000-305984 | 11/2000 |

* cited by examiner

*Primary Examiner*—Alain L. Bashore
(74) *Attorney, Agent, or Firm*—Wenderoth, Lind & Ponack, L.L.P.

(57) ABSTRACT

Points accumulated through a customer's purchase from a point service provider are kept track of by customer information databases in corresponding point service provider servers. A user uses user terminals to access a trade service provider, and receives various services, for example, point trading and point cash, offered by the trade service provider. The trade service provider accesses, as appropriate, the point service provider servers, so that the user's accumulated points are checked or updated. In this manner, the user can effectively use his/her points with no waste, and accordingly the point service system can be improved in its effective use.

20 Claims, 20 Drawing Sheets

FIG. 2

| CUSTOMER SPECIFIC INFORMATION ||ACCUMULATED POINTS |
|---|---|---|
| CUSTOMER ID | PASSWORD | |
| A A A | a a a a a | 5 0 0 P |
| B B B | b b b b b | 1 0 0 0 P |
| C C C | c c c c c | 1 2 5 P |
| ⋮ | ⋮ | ⋮ |

FIG. 4

《 SERVICE MENU 》

· USER REGISTRATION

· USED POINT SERVICE REGISTRATION

· POINT TRADING

· POINT CASH

· CHECK ACCUMULATED POINTS

· POINT-GIFT EXCHANGE

· POINT LOTTO APPLICATION

· VARIOUS SERVICE SETTINGS

FIG. 5

<< USER REGISTRATION PAGE >>

· NAME
_____

· USER ID
_____

· PASSWORD
_____

· ADDRESS FOR GIFT DELIVERY
_____

· BANK ACCOUNT FOR MONEY TRANSFER
_____

F I G. 6

| USER SPECIFIC INFORMATION | | | ADDRESS FOR GIFT DELIVERY | BANK ACCOUNT FOR MONEY TRANSFER | USED POINT SERVICE INFORMATION |
|---|---|---|---|---|---|
| NAME | USER ID | PASSWORD | | | |
| ○○○○ | AAA | a a a | A CITY, TOKYO | account #1111, X BANK | ------- |
| ××××  | BBB | b b b | B CITY, OSAKA | account #2222, Y BANK | ------- |
| △△△△ | CCC | c c c | C CITY, TOKYO | account #3333, Z BANK | ------- |
| ... | ... | ... | ... | ... | ... |

FIG. 8

<< USED POINT SERVICE REGISTRATION PAGE >>

· USER ID _____

· PASSWORD _____

· POINT SERVICE PROVIDER 1
  _____

· CUSTOMER ID _____

· PASSWORD _____

· POINT SERVICE PROVIDER 2
  _____

· CUSTOMER ID _____

· PASSWORD _____

·
                ·
                ·

F I G. 9

| | USED POINT SERVICE INFORMATION | | | | |
|---|---|---|---|---|---|
| POINT SERVICE PROVIDER SERVER 1 | CUSTOMER ID | PASSWORD | POINT SERVICE PROVIDER SERVER 2 | CUSTOMER ID | ... |
| JRB | DDD | dddd | Z SHOP | EEE | ... |
| X GAS STATION | AAA | aaaaa | D SHOP | GGG | ... |
| Y DEPARTMENT STORE | FFFF | fff | X GAS STATION | BBB | ... |
| ... | | | ... | ... | ... |

FIG. 11

<< POINT TRADING PAGE >>

• USER ID  _____

• PASSWORD  _____

POINTS FOR TRADING

• POINT SERVICE PROVIDER

_____

• POINTS  _____ P

↓ DUE DATE  _____

POINTS ASKING FOR

• POINT SERVICE PROVIDER

_____

• POINTS  _____ P

F I G. 12

| USER ID | POINTS FOR TRADING | | POINTS ASKING FOR | | DUE DATE |
|---|---|---|---|---|---|
| | POINT SERVICE PROVIDER | THE NUMBER OF POINTS | POINT SERVICE PROVIDER | THE NUMBER OF POINTS | |
| AAA | Y SHOP | 500P | JRB | 50P | 2000.12.20 |
| EEE | Z SHOP | 50P | Z DEPARTMENT STORE | 50P | 2000.12.28 |
| III | Y SHOP | 1000P | D SHOP | 200P | 2001.02.20 |
| ... | ... | ... | ... | ... | ... |

F I G. 1 4

<< POINT CASH PAGE >>

· USER ID _____

· PASSWORD _____

POINTS FOR CASH

· POINT SERVICE PROVIDER
　　_____

· POINTS _____ P

F I G. 1 5

| POINT SERVICE PROVIDER | BASIC RATE (YEN/POINT) | EXPIRATION DATE |
|---|---|---|
| Y SHOP | 1.00 | 2010.12.31 |
| Z SHOP | 2.50 | NO-TIME-LIMIT |
| Z DEPARTMENT STORE | 5.00 | 2005.06.30 |
| ... | ... | ... |

FIG. 16

| POINT SERVICE PROVIDER | THE NUMBER OF RETAINED POINTS |
|---|---|
| Y SHOP | 1 2 5 0 0 P |
| JRB | 1 3 2 0 P |
| B GAS STATION | 1 2 5 0 P |
| D SHOP | 0 P |
| X DEPARTMENT STORE | 2 5 8 8 0 P |
| Y SHOP | 5 3 1 0 P |
| ⋮ | ⋮ |

F I G. 17

| POINT SERVICE PROVIDER | BASIC RATE (YEN/POINT) | POPULARITY (TIMES) |
|---|---|---|
| Y SHOP | 1.00 | 3401 |
| Z SHOP | 2.50 | 53 |
| Z DEPARTMENT STORE | 5.00 | 205 |
| ... | ... | ... |

F I G. 1 8

| POINT SERVICE PROVIDER | POINT TRADING SERVICE | POINT CASH SERVICE |
|---|---|---|
| Y SHOP | YES | YES |
| X SHOP | NO | YES |
| Z DEPARTMENT STORE | YES | YES |
| ... | ... | ... |

FIG. 19

| POINT TRADING TO / POINT TRADING FROM | Y SHOP | X SHOP | Z DEPARTMENT STORE | ... |
|---|---|---|---|---|
| Y SHOP | | 0.40 | 0.20 | ... |
| X SHOP | 2.50 | | 0.50 | ... |
| Z DEPARTMENT STORE | 5.00 | 2.00 | | ... |
| ... | ... | ... | ... | ... |

FIG. 20

| POINT TRADING TO / POINT TRADING FROM | Y SHOP | X SHOP | Z DEPARTMENT STORE | ... |
|---|---|---|---|---|
| Y SHOP |  | 0.35 | 0.18 | ... |
| X SHOP | 2.25 |  | 0.45 | ... |
| Z DEPARTMENT STORE | 4.50 | 1.80 |  | ... |
| ... | ... | ... | ... | ... |

POINT SERVICE SYSTEM

BACKGROUND OF THE INVENTION

1. Field of the Invention

The present invention relates to point service systems and, more specifically, to point service systems for providing customers with various services over a network in accordance with their acquired points.

2. Description of the Background Art

Point services have been popularly offered by shops to their customers. The customers acquire points in accordance with their purchases, and their points are accumulated to exchange for any particular gifts. Such point services are varying in type, and the customers' acquired points may be recorded on point cards which are handed to the customers at whatever shop offering point services. The points may also be stored in a database on a customer basis, and the shops notify, as appropriate, their customers of how many points they have acquired so far.

With such point services, the customers have the merit of obtaining various gifts by regularly doing their shopping at specific shops. On the other hand, the shops can feel assured that their offering point services encourage customers to visit them again, leading to an increase in their sales.

Some point services set expiration dates. In such a case, once an expiration date has been passed, the corresponding points will be useless. Accordingly, if the expiration date is getting close, the customers feel prompted to make purchases at the corresponding shop to acquire some more points to exchange those for any desired gifts. This will also lead to an increase in sales.

Such conventional point services, however, do not work effectively enough if the customers make purchases at shops where they hardly visit, during a trip, for example. If the resultant points are not enough to exchange for any gifts, the points will be wasted.

Moreover, as to point services with expiration dates set, the points will be also wasted if there are not enough, even a few points, to exchange for any desired gifts before their expiration date. If the customers do not want to waste their points, they have no choice but to exchange those for any other gift available for the points. If there is no available gift, the points will be totally wasted.

SUMMARY OF THE INVENTION

Therefore, an object of the present invention is to provide point service systems which enhance the effective use of point services without letting customers waste their accumulated points.

The present invention has the following features to attain the object above.

One aspect of the present invention is directed to a point service system for offering various point services over a network in accordance with the number of points possessed by a customer. The point service system comprises: a point service provider server for keeping track of the number of points on a customer basis in a customer information database; a user terminal; and a trade service provider which is connected, over the network, to the point service provider server and the user terminal. The trade service provider comprises: a deal request reception section for receiving a point deal request from the user terminal; a deal making section for making a predetermined deal based on the point deal; and a point change section for changing the user's number of points which is kept track of in the customer information database when a change to the user's points occurs due to the deal made by the deal making section.

As described above, in the aspect, the contents of the customer information database in the point service provider server are changed in accordance with various deals arranged in the trade service provider. Therefore, point trading can be performed without restraint.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing the data structure of customer information databases 12 and 14 of FIG. 1;

FIG. 4 is a diagram showing an exemplary service menu page;

FIG. 5 is a diagram showing an exemplary user registration page;

FIG. 6 is a diagram showing the data structure of a user information database 16;

FIG. 8 is a diagram showing an exemplary used point service registration page;

FIG. 9 is a diagram showing the data structure of a part relevant to the used point service information of the user information database 16;

FIG. 11 is a diagram showing an exemplary point trading page;

FIG. 12 is a diagram showing the data structure of a trading condition tracking database 18;

FIG. 14 is a diagram showing an exemplary point cash page;

FIG. 15 is a diagram showing the data structure of a cash rate database 20;

FIG. 16 is a diagram showing the data structure of a point tracking database 22;

FIG. 17 is a diagram showing the data structure of the cash rate database in a case of varying cash rates in accordance with popularity;

FIG. 18 is a diagram showing the data structure of a restriction information database;

FIG. 19 is a diagram showing the data structure of a trading rate database; and

FIG. 20 is a diagram showing another data structure of the trading rate database.

DESCRIPTION OF THE PREFERRED EMBODIMENT

In the below description, one embodiment of the present invention is described by referring to the accompanying drawings.

Figure 1:
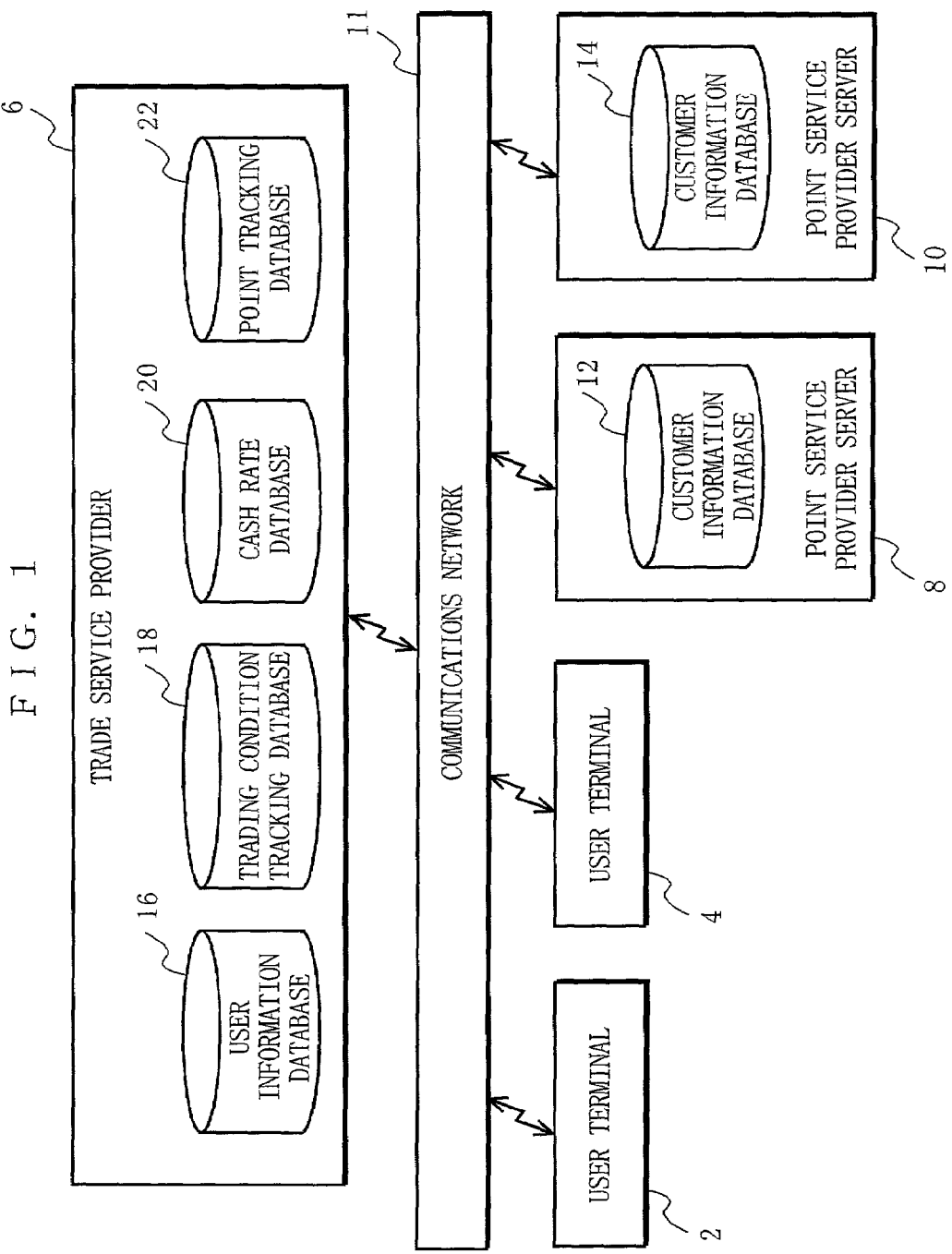
FIG. 1 is a drawing showing a system in its entirety according to one embodiment of the present invention.

Referring to FIG. 1, described is a system of the present embodiment in its entirety. In FIG. 1, the system includes user terminals 2 and 4, a trade service provider 6, and point service provider servers 8 and 10, all of which are connected over a communications network 11.

The user terminals 2 and 4 can be realized by personal computers, mobile phones, navigation devices of a vehicle-mounting type, and the like, which are provided with an input function, a display function, and a communications function. The trade service provider 6 includes databases exemplified by a user information database 16, a trading condition tracking database 18, a cash rate database 20, and a point tracking database 22 so as to provide the user with various services, which are characteristics of the present invention. The point service provider servers 8 and 10 are provided on a point service provider basis, and therein, customer information databases 12 and 14 keep track of the customers' points accumulated in accordance with their purchases as customer information together with any other specific information about the customers such as customer IDs and passwords (hereinafter, customer specific information).

Described next, roughly, is how services are provided in the system of the present embodiment.

Customers' points accumulated in accordance with their purchases at whatever point service provider are kept track by the corresponding point service provider servers 8 and 10, specifically, by the customer information databases 12 and 14 together with customer specific information including customer IDs and passwords. FIG. 2 shows an example of the data structure of the customer information databases 12 and 14. Every time a customer makes purchases, his/her points stored in the customer information databases 12 and 14 are updated. The customer specific information is, for example, registered at the customer's first purchase, and is used as means for authenticating the customer, if necessary, when he/she wants to know how many points he/she has, or to exchange his/her points for a gift.

The user accesses the trade service provider 6 by using the user terminals 2 and 4 so as to receive various services (e.g., point trading, point cash) provided by the trade service provider 6. At that time, the trade service provider 6 accesses any appropriate point service provider servers 8 and 10 so that the user's points are checked or updated. The trade service provider 6 then notifies the processing result to the user terminals 2 and 4, and then ends the processing.

The operation of the system when the trade service provider 6 offers various services is described below in more detail.

(User Registration)

Figure 3:
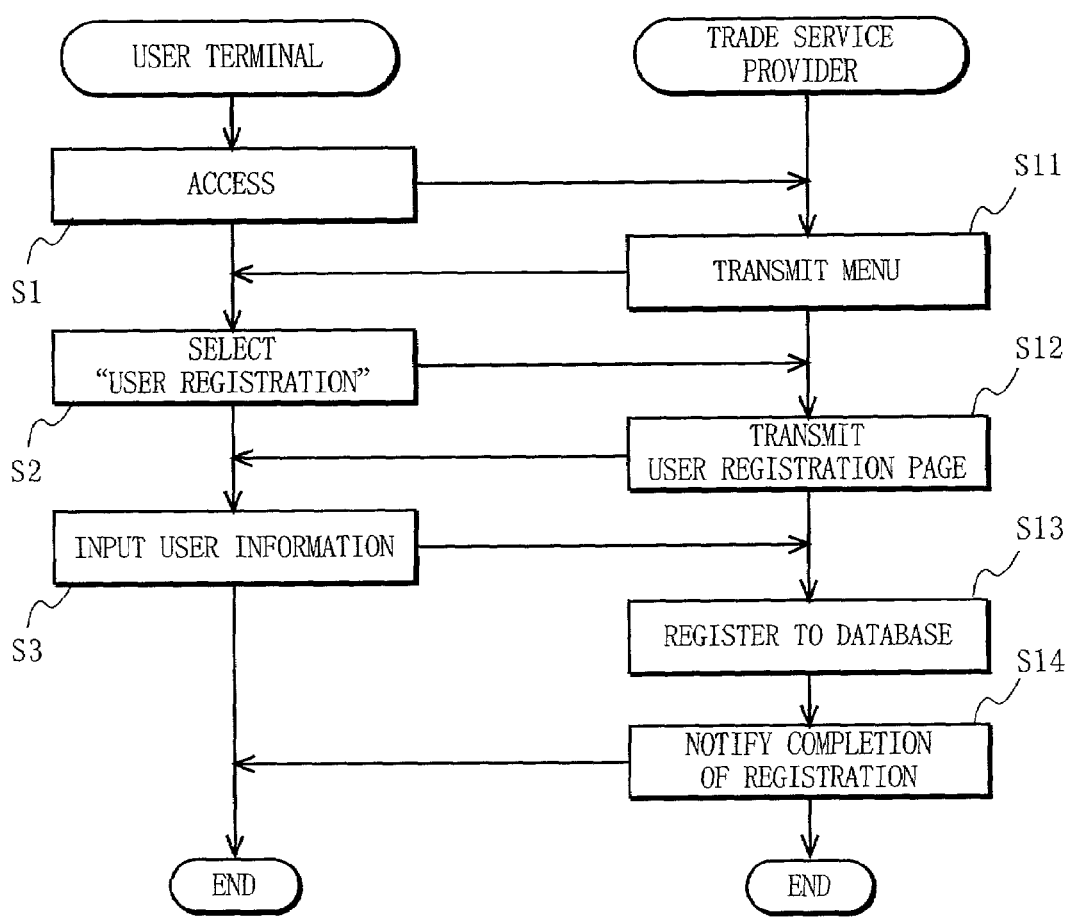
FIG. 3 is a flowchart showing a sequence of processes for user registration.

In order to use various services offered by the trade service provider 6, the user has to go through user registration first. By referring to the flowchart shown in FIG. 3, a sequence of processes for user registration is now described.

The user first accesses the trade service provider 6 (S1). In response, the trade service provider 6 transmits a service menu (S11). An example of the service menu is shown in FIG. 4. The user then selects an item "User Registration" from the service menu for transmission (S2).

Then, the trade service provider 6 transmits a user registration page (S12). An example of the user registration page is shown in FIG. 5. In accordance with the format of the user registration page, the user inputs his/her specific information (e.g., name, user ID, password), an address for gift delivery, and a bank account for money transfer. These inputs are transmitted as user information (S3). The trade service provider 6 registers the user information coming from the user terminals 2 and 4 to the user information database 16 (S13). An example of the data structure of the user information database 16 is shown in FIG. 6. Here, an item "Used Point Service Information" of FIG. 6 is left for later description. Once registration to the user information database 16 has been completed, the trade service provider 6 transmits, to the user terminals 2 and 4, a notification that user registration is now completed (S14). This is the end of the user registration.

(Used Point Service Registration)

Figure 7:
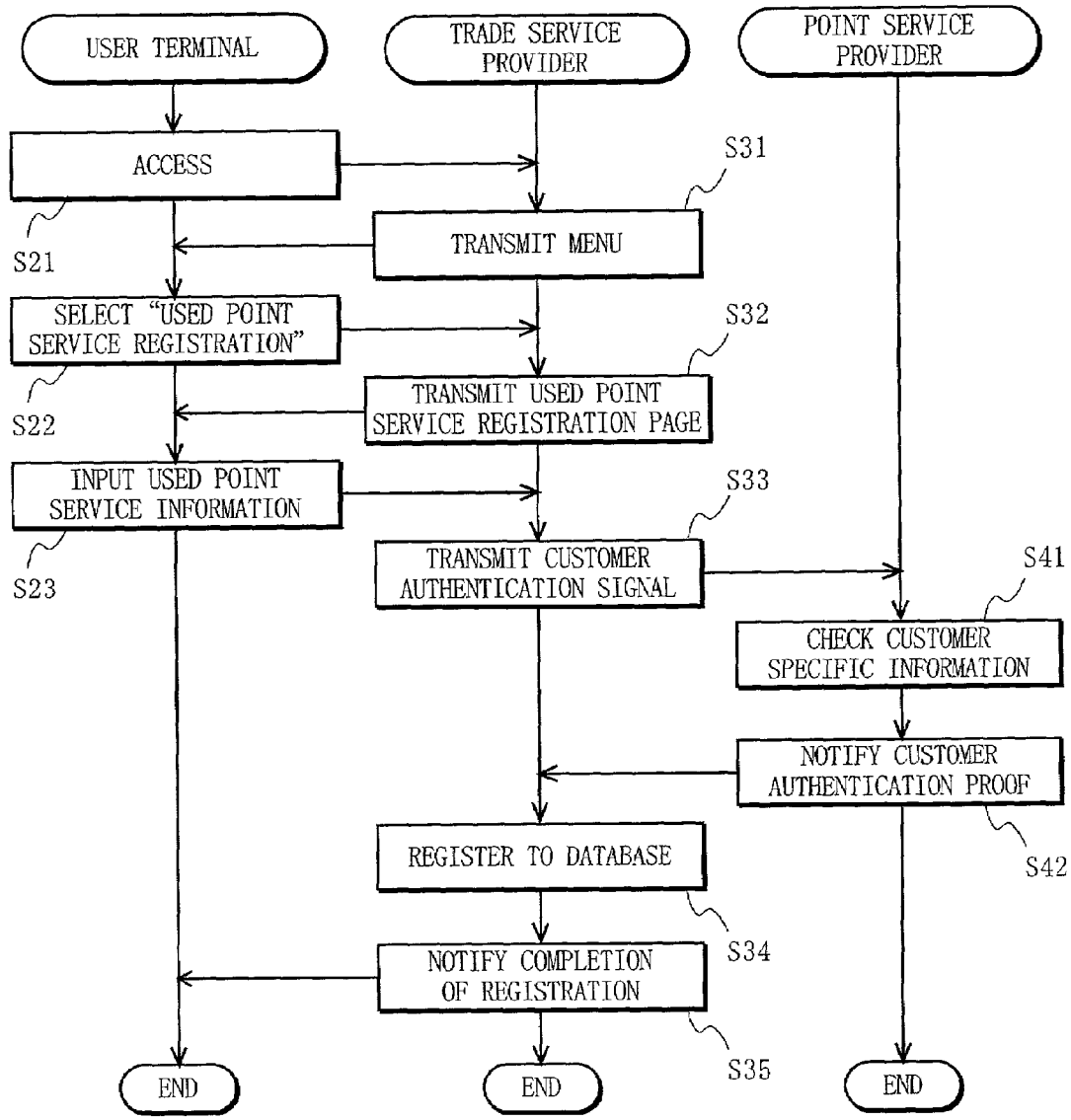
FIG. 7 is a flowchart showing a sequence of processes for used point service registration.

After completion of the user registration, the user needs to notify, for registration, the trade service provider 6 of what point service(s) he/she has been using. By referring to the flowchart of FIG. 7, a sequence of processes for used point service registration is now described.

The user first accesses the trade service provider 6 (S21). In response, the trade service provider 6 transmits a service menu (S31). This service menu is the same as that shown in FIG. 4. The user then selects an item "Used Point Service Registration" from the service menu for transmission (S22).

The trade service provider 6 transmits a used point service registration page (S32). An example of the used point service registration page is shown in FIG. 8. In accordance with the format of the used point service registration page, the user makes inputs on a currently-using point service basis. Specifically, the user inputs used point service information, which is composed of point service identification information, e.g., point service provider's name, and the customer specific information which has been already registered on a point service basis as shown in FIG. 2. The used point service information is transmitted together with the user specific information which has been set at the time of user registration (S23).

The trade service provider 6 checks the validity of the used point service information coming from the user terminals 2 and 4. To be specific, the trade service provider 6 transmits, to the point service provider servers 8 and 10 which correspond to the user's inputted point service identification information, a customer authentication signal including the user's inputted customer specific information (S33). In response, the point service provider servers 8 and 10 compare the customer specific information included in the customer authentication signal with the customer specific information in the customer information databases 12 and 14 (S41). If the customer is authenticated thereby, a customer authentication proof is transmitted (S42). Note herein that, if the user is not authenticated as a customer due to any error found in the user's inputted customer specific information, the user terminals 2 and 4 are notified as such via the trade service provider 6. Therefore, this used point service registration results in a failure.

Upon receipt of the customer authentication proof, the trade service provider 6 registers the corresponding used point service information to the user information database 16 (S34). FIG. 9 shows a part of the exemplary data structure of the user information database 16 where the used point service information is registered. After completely registering the used point service information to the user information database 16, the trade service provider 6 transmits, to the user terminals 2 and 4, a notification that registration of the used point service information is now completed (S35). This is the end of the used point service registration.

After completion of both the user registration and the used point service registration, various services offered by the trade service provider 6 become available for the user. Described below are those services available from the trade service provider 6.

(Point Trading Service)

The user can trade his/her points of any specific point service with other users' points of any other point service by mutual agreement. By referring to the flowchart of FIG. 10, described below is a sequence of processes for such a point trading service.

The user first accesses the trade service provider 6 (S51). In response, the trade service provider 6 transmits a service menu (S61). This service menu is the same as that of FIG. 4. The user selects an item "Point Trading" from the service menu for transmission (S52).

The trade service provider 6 then transmits a point trading page (S62). An example of the point trading page is shown in FIG. 11. In accordance with the format of the point trading page, the user designates how many points of which point service are to be traded and under what trading condition. Here, the trading condition indicates how many points of which point service are asked for by when. Such information is transmitted together with the user specific information (S53).

The trade service provider 6 checks the validity of the trading condition coming from the user terminals 2 and 4. In more detail, the trade service provider 6 reads, from the user information database 16, the customer specific information corresponding to the user's points for trading, and to the point service provider servers 8 and 10, transmits a point check signal including the customer specific information (S63). Based on the point check signal, the point service provider servers 8 and 10 read the user's points from the customer information databases 12 and 14 for transmission to the trade service provider 6 (S71). If the user's points are larger in number than the points for trading, the trade service provider 6 determines that the trading condition is valid (S64). Here, if the trading condition is not determined as being desirably valid, the user terminals 2 and 4 are notified as such, whereby point trading does not work out.

When the trading condition is determined as being valid (S64), the trade service provider 6 searches the trading condition tracking database 18 for any appropriate trading condition satisfying the trading condition (S65). Here, the trading condition tracking database 18 includes other users' trading conditions so far registered thereto. FIG. 12 shows an example of the data structure of the trading condition tracking database 18. As one example, upon receipt of a point trading page which asks for a trade of "200 points (i.e., 200P) of D shop" for "1000P of Y shop", the trade service provider 6 searches the trading condition tracking database 18 for any appropriate trading condition satisfying the above trading condition. In this example of FIG. 12, the trade service provider 6 selects the trading condition found under the user ID of "III" to work out this point trading.

After any appropriate trading condition is selected (S65), the trade service provider 6 notifies the point service provider servers 8 and 10 that the number of the user's points is to be changed (S66). This is done to help the point service provider servers 8 and 10 to reflect the change to the points keeping track of therein. Specifically, the trade service provider 6 transmits, to the corresponding point service provider servers 8 and 10, a signal including the customer specific information which has been registered in the user information database 16, and information about the specific increase or decrease of the points (S66).

Upon receipt of the notification, the point service provider servers 8 and 10 update the points in the customer information databases 12 and 14 (S72), and then notifies the trade service provider 6 that point update is now completed (S73). In response to the notification, the trade service provider 6 notifies the corresponding user terminals 2 and 4 that point trading is now completed (S67).

Figure 10:
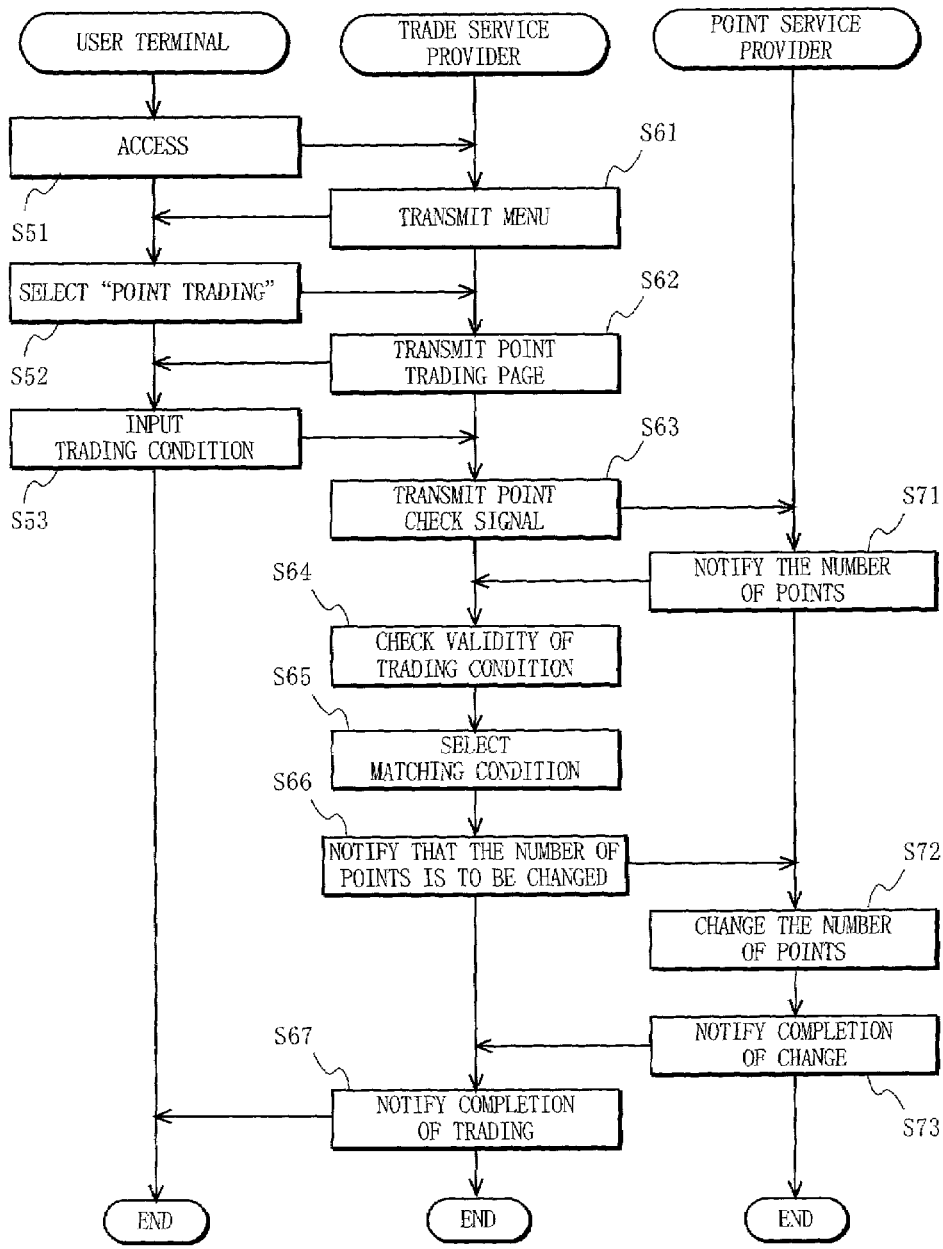
FIG. 10 is a flowchart showing a sequence of processes for point trading service.

Here, in step S65 of FIG. 10, if no appropriate trading condition is found, the user's trading condition is registered in the trading condition tracking database 18 together with the user's ID so as to be kept track of until its due date comes. In such a manner, the user's trading condition can wait for any appropriate trading condition of any other user until its due date comes. The due date can be arbitrarily set by users.

In the above, point trading presumably requires perfect matching between two trading conditions. Alternatively, in order to facilitate point trading between users, the matching degree between trading conditions may be lowered. For example, if found any trading condition offering points with a point difference from the user's points falls within a range of 10% or less, the trade service provider 6 notifies the user as such to let him/her think whether or not to compromise. Also, the contents of the trading condition tracking database 18 may be made accessible to users.

In a case that point trading is possible only among three or more users, this will do.

When point trading works out between users, the users may be required to pay fees to the trade service provider 6.

By using such a point trading service, the user can trade his/her unwanted points for any other points which he/she wants. Accordingly, even if the customers make purchases at stores where they hardly visit, during a trip, for example, the resultant points can be traded for any other points they need for gift exchange. Therefore, the points can be effectively used with no waste.

(Point Cash Service)

Figure 13:
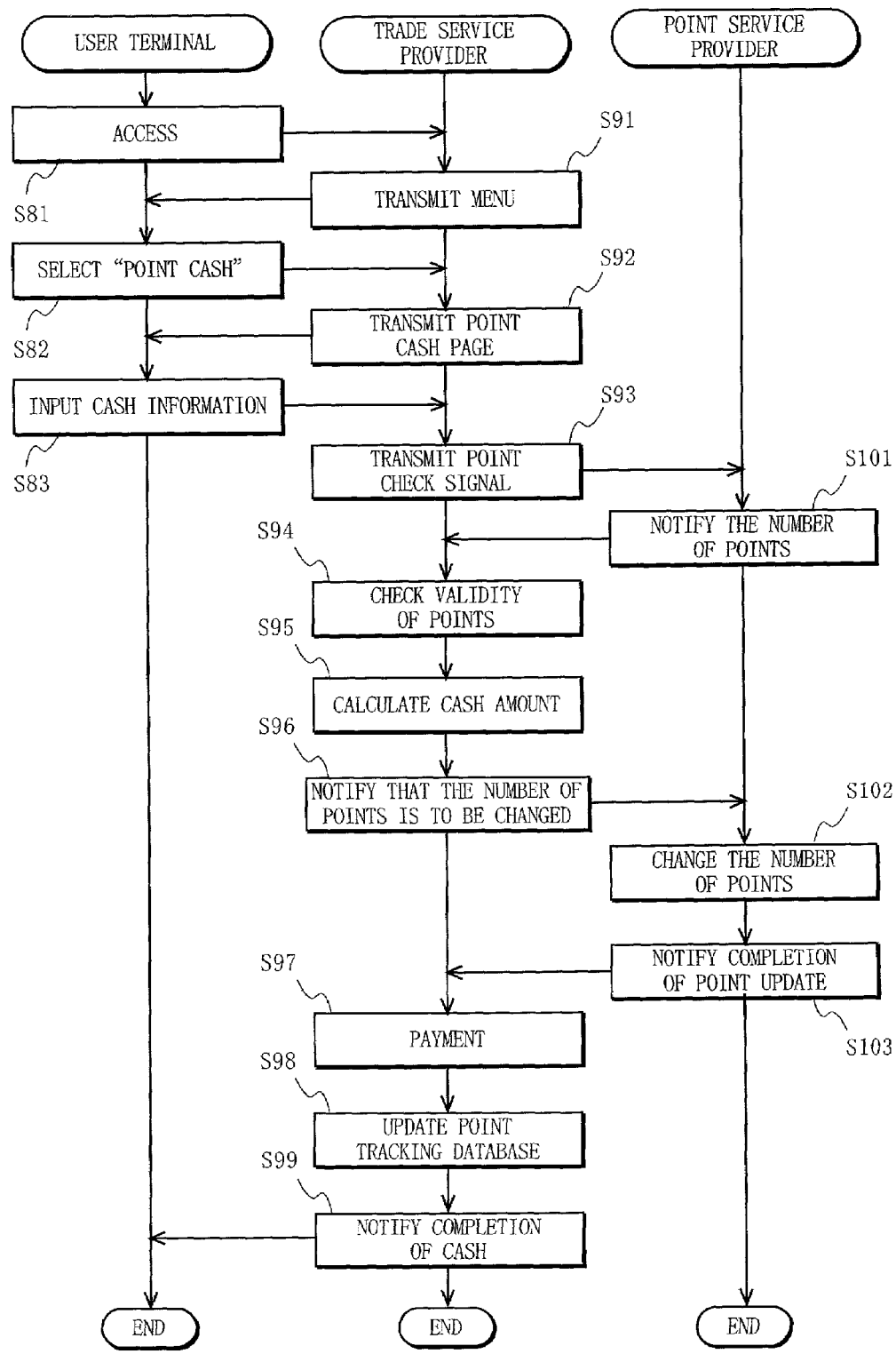
FIG. 13 is a flowchart showing a sequence of processes for point cash service.

The user can cash his/her points of any specific point service at a predetermined rate. By referring to the flowchart of FIG. 13, described below is a sequence of processes for such a point cash service.

The user first accesses the trade service provider 6 (S81). In response, the trade service provider 6 transmits a service menu (S91). This service menu is the same as that of FIG. 4. The user then selects an item "Point Cash" from the service menu for transmission (S82).

The trade service provider 6 transmits a point cash page (S92). An example of the point cash page is shown in FIG. 14. In accordance with the format of the point cash page, the user designates cash information about how many points of which point service provider he/she wants to cash. The cash information is transmitted together with the user specific information (S83).

The trade service provider 6 then checks the validity of the cash information coming from the user terminals 2 and 4. To be specific, the trade service provider 6 reads, from the user information database 16, the customer specific information corresponding to the points for cash. Then, the point check signal including the customer specific information is transmitted to the point service provider servers 8 and 10 (S93). Based on the point check signal, the point service provider servers 8 and 10 read the user's points from the customer information databases 12 and 14 for transmission to the trade service provider 6 (S101). If the user's points are larger in number than the points for cash, the trade service provider 6 determines that the cash information is valid (S94). Here, if the cash information is not determined as being desirably valid, the user terminals 2 and 4 are notified as such, whereby point cash is failed.

Once the cash information has been determined as being valid (S94), the trade service provider 6 refers to the cash rate database 20 so as to calculate a cash rate with respect to the user's points for cash (S95). FIG. 15 shows an example of the data structure of the cash rate database 20. As one example, if the user's points for cash are those offered by a "Z shop", the cash rate database 20 is referred to for finding a basic rate "2.50 (Yen/P)". Then, multiplying the basic rate by the number of points for cash will find the cash amount.

In FIG. 15, a point expiration date is arbitrarily set by each of the point service providers, and indicates until when the point service is to be valid. Once the expiration date has been passed, the corresponding points become worthless. In this viewpoint, unless the points are enough for gift exchange, the closer the expiration date, the lower the value of the corresponding points. Therefore, the number of days left before the expiration date from today is calculated so that the resultant number is utilized as a variable for calculating the cash rate. In this manner, the points are to be appropriately decreased in value depending on whether the expiration date is getting close. For example, the cash rate may be calculated by multiplying the basic rate by a rate which is decreased in accordance with the number of days left before the expiration date.

After the cash amount is calculated (S95), the trade service provider 6 notifies the point service provider servers 8 and 10 that the number of points is to be changed (S96). This is done to help the point service provider servers 8 and 10 to reflect the change to the points being kept track of therein. Specifically, the trade service provider 6 transmits, to the corresponding point service provider servers 8 and 10, a signal including the customer specific information which has been registered in the user information database 16, and information about the specific increase or decrease of the points.

In response to the notification, the point service provider servers 8 and 10 update the customer's points in the customer information databases 12 and 14 (S102), and then notify the trade service provider 6 that the point update is now completed (S103). In response to the notification, the trade service provider 6 transfers the cash amount calculated in step S96 to the user's bank account specified at the time of user registration (S97). Here, the bank account is found in the user information database 16 as shown in FIG. 6. After completion of the money transfer, the trade service provider 6 reflects the number of the user's points which has been cashed to the point tracking database 22 (S98). FIG. 16 shows the data structure of the point tracking database 22, which is provided to keep track of, on a point service basis, the resultant points bought from the user in the above manner, and now possessed by the trade service provider 6. After completion of registration to the database, the user terminals 2 and 4 are notified that the point cash is now completed (S99).

In the above description, the user does not specifically check and approve the cash amount. An additional step may be provided to notify the user terminals 2 and 4 of the cash amount calculated in step S96 of FIG. 13 so that the user's approval is obtained.

In the above described point cash service, the cash rate presumably varies depending on the number of days left before the expiration date. This is not restrictive, and the cash rate may be set to vary over time as circumstances demand in accordance with some other parameters. As one example, the higher the popularity or rarity of the points at the time of cash, the higher the cash rate becomes. The popularity of the points may be automatically determined by counting the number of times specified as "points asking for" found in the trading condition of FIG. 12 in the point trading service. If this is the case, as shown in FIG. 17, the cash rate database 20 keeps track of "popularity", which is equal to the number of times specified as "points asking for".

The basic rate is accordingly increased or decreased based on the "popularity", i.e., the number of times, so that the cash rate is determined.

By using such a point cash service, the user can cash his/her unwanted points, or points which are to be soon expired. Accordingly, even if the customers make purchases at stores where they hardly visit, during a trip, for example, the resultant points can be cashed. Therefore, the points can be effectively used with no waste.

The original purpose of the point services is to encourage customers to regularly make purchases at whatever shop offering point services. The issue here is, if the above described point trading service or point cash service becomes popular, the point services become less appealing, causing inconvenience for some shops. In this viewpoint, it is preferable for the point service system to include such a mechanism that point service providers can exercise their discretion to decide whether or not to allow such a point trading service or a point cash service. In this case, the trade service provider 6 keeps track of information about restrictions imposed on point trading or point cash in any appropriate database (not shown), which is now referred to as a restriction information database. As shown in FIG. 18, the restriction information database keeps track of information about whether the point trading service and/or the point cash service is available on a point service provider basis. In the example of FIG. 18, the points offered by the "X shop" can be cashed through the point cash service, but not traded through the point trading service. The restriction information database is referred to at the time of the point trading service or the point cash service. At the time of the point trading service, in FIG. 10, in a time range from step S53 to step S63, i.e., after a trading condition coming from the user terminals 2 and 4 is received and before a point check signal is transmitted, the restriction information database is referred to for checking whether the point trading service is allowed for the points included in the trading condition. If allowed, the processes are continued, otherwise the point trading is terminated. The same process is applied to the point cash service.

Such a restriction information database is preferably arbitrarily set by each of the point service providers via the communications network 11.

Here, the points which are kept track of by the trade service provider 6 in the point tracking database 22 can be cashed by the point service providers, sold to any other users, and traded for any other users' points, as appropriate. By arbitrarily setting rates for cash, selling, and trading, the trade service provider 6 can benefit without charging the users a fee, for example.

In the case that the user wants to trade his/her points for any other points he/she wants, the user transmits a point trading request together with the user specific information from the user terminals 2 and 4 to the trade service provider 6. Here, the point trading request includes the user specific information and information about how many points of which point service are to be traded for how many points of which point service. Here, in the trade service provider 6, any appropriate database (not shown), which is now referred to as a trading rate database, keeps track of trading rates in such a table as shown in FIG. 19. Upon receipt of the point trading request, the trade service provider 6 performs point trading in accordance with the trading rates found in the table. Here, the trading rates may be freely set.

When the trading rates are so set as shown in FIG. 19, point trading will show reversibility. Assuming that a user wants to trade his/her 10000 points of an X shop with points of a Y shop, a trading rate for such a case is 0.40. Accordingly, the user will obtain 4000 points of the Y shop. Thereafter, if the same user wants to trade again his/her 4000 points of the Y shop with points of the X shop, a trading rate therefor is 2.50, leading back to 10000 points of the X shop which the user originally had.

On the other hand, when the trading rates are so set as shown in FIG. 20, point trading will show irreversibility. Assuming that a user wants to trade his/her 10000P points of an X shop with points of a Y shop, a trading rate for such a case is 0.35. Accordingly, the user will obtain 3500 points of the Y shop. Thereafter, if the same user wants to trade again his/her 3500 points of the Y shop with points of the X shop, a trading rate therefor is 2.25, leading to 7875 points of the X shop which are less than those the user originally had. Here, the decrease, i.e., 2125 points of the X shop, is the trade service provider's profit.

Here, those trading rates of which are kept track in the trading rate database can be arbitrarily set. As mentioned in the foregoing, the original purpose of the point services is to encourage customers to regularly make purchases at whatever shop offering point services. The issue here is, if points offered thereby are easily traded for competitors' points, the point services result in assisting the shops to lose their customers to the competitors. An effective solution to such a problem is setting trading rates with respect to the competitors especially lower than usual, or prohibiting point trading for the competitors' points. Conversely, setting trading rates with respect to allies especially higher than usual will also work. Such weighing to the trading rates may be done in the same manner as the cash rates of FIG. 15. That is, for point trading, a constant basic rate may be set so as to use as a basis to vary the trading rates in accordance with the relationship between the point service providers, i.e., competitors or allies. In such cases, a database may be additionally provided to keep track of the relationship among the point service providers so that this database is referred to for determining the trading rates.

In such a process applied based on the point trading request, as already described, it is preferable to check the validity of the point trading request based on the user specific information. The trading rates may, as already described, vary over time in accordance with the expiration dates and popularity of the points.

(Other Services)

Other than the above services, the trade service provider 6 can offer various more services.

For example, there may be a "messaging service" for notifying the user terminals 2 and 4 when the user's points are accumulated to be enough for gift exchange, when his/her points reaches the number exchangeable with better gifts, and when the user's points are about to expire, for example. Such a "messaging service" may be used to notify what service is available for the user whenever the user's points are changed in number due to the point trading service or the point purchase. For example, if the user's points are increased in number after the point trading service, a list indicating what gifts are available for the points may be transmitted to the user terminals 2 and 4.

There is also a "gift order service" offered to the user when his/her points reaches any specific number for gift exchange. With the gift order service, the user terminals 2 and 4 may be automatically notified and prompted for gift exchange, and any gift selected by the user may be accordingly ordered. With such a service, the user information registered at the time of user registration and stored in the user information database 16 is utilized to know the user's name and address for gift delivery.

Also, there may be a "point lotto service" for trading or cashing any unwanted points or long-unused point cards in the same manner as a lotto.

When any new gift or service is added, a "gift information commercial service" is also possible for providing such information to users who are considered appropriate for the new gift or service.

As such, with the present point service system, the trade service provider 6 can link a plurality of point service providers and customers. Therefore, the services offered by the point service providers to the customers can be more generic.

So far, points have to be enough for gift exchange. Otherwise, they are considered valueless. According to the present point service, however, the contents of the customer information databases 12 and 14 are changed in accordance with various deals arranged in the trade service provider 6. Therefore, no matter how many points the user has, every point has worth as gift certificates and money. Accordingly, there may be a possibility for point auction, extending the use of the points to new possibilities.

While the invention has been described in detail, the foregoing description is in all aspects illustrative and not restrictive. It is understood that numerous other modifications and variations can be devised without departing from the scope of the invention.

What is claimed is:

1. A point service system for offering point services over a network in accordance with a number of points possessed by a customer, the point service system comprising:
    a point service provider server having a customer information database for keeping track of a number of points on a customer basis;
    a user terminal for making a point deal request including a point trading condition; and
    a trade service provider which is connected, over the network, to said point service provider server and said user terminal,
    wherein said trade service provider comprises:
        a trading condition tracking database for keeping track of the point trading condition;
        deal request reception means for receiving the point deal request from said user terminal;
        deal making means for making a predetermined deal between users based on the point deal request by searching said trading condition tracking database to find any point trading condition corresponding to the point trading condition received by said deal request reception means for point trading; and
        point change means for changing a number of points of a user which is kept track of in said customer information database when a change to the number of points of the user occurs due to the predetermined deal between users made by said deal making means as a result of the point trading.

2. The point service system according to claim 1, wherein when said deal making means does not find any point trading condition corresponding to the point trading condition received by said deal request reception means in said trading condition tracking database, the received point trading condition is newly registered to said trading condition tracking database.

3. The point service system according to claim 2, wherein the point trading condition includes information about a due date, and said trading condition tracking database keeps track of the point trading condition until the due date is reached.

4. The point service system according to claim 1, wherein said customer information database includes customer specific information, and said point service system further comprises means for checking a validity of the point trading condition received by said deal request reception means based on the number of points of the user and the customer specific information kept track of in said customer information database.

5. A point service system for offering point services over a network in accordance with a number of points possessed by a customer, the point service system comprising:

a point service provider server having a customer information database for keeping track of a number of points on a customer basis;

a user terminal for making a point deal request including cash information; and a trade service provider which is connected, over the network, to said point service provider server and said user terminal, wherein said trade service provider comprises:

a cash rate database for keeping track of a point cash rate and including information about an expiration date of the point cash rate on a point service provider basis;

deal request reception means for receiving the point deal request from said user terminal;

deal making means for making a predetermined deal based on the point deal request by calculating a cash amount based on the cash information received by said deal request reception means, and the point cash rate, and making a payment based on the cash amount; and point change means for changing a number of points of a user which is kept track of in said customer information database when a change to the number of points of the user occurs due to the predetermined deal made by said deal making means as a result of the calculation performed by said deal making means, and wherein the point cash rate varies over time and is set in consideration of a number of days left to the expiration date.

6. A point service system for offering point services over a network in accordance with a number of points possessed by a customer, the point service system comprising:

a point service provider server having a customer information database for keeping track of a number of points on a customer basis;

a user terminal for making a point deal request including cash information; and a trade service provider which is connected, over the network, to said point service provider server and said user terminal, wherein said trade service provider comprises:

a cash rate database for keeping track of a point cash rate and including information about popularity of points on a point service provider basis;

deal request reception means for receiving the point deal request from said user terminal;

deal making means for making a predetermined deal based on the point deal request by calculating a cash amount based on the cash information received by said deal request reception means, and the point cash rate, and making a payment based on the cash amount; and point change means for changing a number of points of a user which is kept track of in said customer information database when a change to the number of points of the user occurs due to the predetermined deal made by said deal making means as a result of the calculation performed by said deal making means, and wherein the point cash rate varies over time and is set in consideration of the popularity of the points.

7. A point service system for offering point services over a network in accordance with a number of points possessed by a customer, the point service system comprising:

a point service provider server having a customer information database for keeping track of a number of points on a customer basis;

a user terminal for making a point deal request; and a trade service provider which is connected, over the network, to said point service provider server and said user terminal, wherein said trade service provider comprises:

a restriction information tracking database for keeping track of restriction information which defines whether or not a predetermined deal including at least one of point trading and cashing of points is allowed on a point service provider basis;

deal request reception means for receiving the point deal request from said user terminal;

deal making means for determining, based on the restriction information, whether or not a deal relating to the point deal request received by said deal request reception means is allowed and making the predetermined deal based on the point deal request only when the deal is allowed; and point change means for changing a number of points of a user which is kept track of in said customer information database when a change to the number of points of the user occurs due to the predetermined deal made by said deal making means.

8. A point service system for offering point services over a network in accordance with a number of points possessed by a customer, the point service system comprising:

a point service provider server having a customer information database for keeping track of a number of points on a customer basis;

a user terminal for making a point deal request including a point trade request; and a trade service provider which is connected, over the network, to said point service provider server and said user terminal, wherein said trade service provider comprises:

a trading rate database for keeping track of a trading rate between point services on a point service provider basis;

deal request reception means for receiving the point deal request from said user terminal;

deal making means for making a predetermined deal based on the point deal request by calculating a number of points to be acquired based on the trading rate, and the point trade request received by said deal request reception means, and carrying out point trading; and point change means for changing a number of points of a user which is kept track of in said customer information database when a change to the number of points of the user occurs due to the predetermined deal made by said deal making means as a result of the point trading.

9. The point service system according to claim 8, wherein the trading rate is determined based on a relationship between any relevant point service providers.

10. The point service system according to claim 8, wherein
said customer information database further includes customer specific information, and
said point service system further comprises means for checking a validity of the point trading request received by said deal request reception means based on the number of points and the customer specific information kept track of in said customer information database.

11. A trade service device for connection to a point service provider server for keeping track of a number of points on a customer basis in a customer information database and a user terminal over a network for offering point services in accordance with a number of points possessed by a customer, the trade service device comprising:
deal request reception means for receiving a point deal request including a point trading condition from the user terminal;
a trading condition tracking database for keeping track of the point trading condition for point trading;
deal making means for making a predetermined deal between users based on the point deal request by searching said trading condition tracking database to find any point trading condition corresponding to the point trading condition received by said deal request reception means for point trading; and
point change means for changing a number of points of a user which is kept track of in the customer information database when a change to the number of points of the user occurs due to the predetermined deal between users made by said deal making means as a result of the point trading.

12. A trade service device for connection to a point service provider server for keeping track of a number of points on a customer basis in a customer information database and a user terminal over a network for offering point services in accordance with a number of points possessed by a customer, the trade service device comprising:
a cash rate database for keeping track of a point cash rate and including information about an expiration date of the point cash rate on a point service provider basis;
deal request reception means for receiving a point deal request including cash information from the user terminal;
deal making means for making a predetermined deal based on the point deal request by calculating a cash amount based on the cash information received by said deal request reception means, and the point cash rate, and making a payment based on the cash amount; and
point change means for changing a number of points of a user which is kept track of in the customer information database when a change to the number of points of the user occurs due to the predetermined deal made by said deal making means as a result of the calculation performed by said deal making means,
wherein the point cash rate varies over time and is set in consideration of a number of days left to the expiration date.

13. A trade service device for connection to a point service provider server for keeping track of a number of points on a customer basis in a customer information database and a user terminal over a network for offering point services in accordance with a number of points possessed by a customer, the trade service device comprising:
a restriction information tracking database for keeping track of restriction information which defines whether or not a predetermined deal including at least one of point trading and cashing in of points is allowed on a point service provider basis;
deal request reception means for receiving a point deal request from the user terminal;
deal making means for determining, based on the restriction information, whether or not a deal relating to the point request received by said deal request reception means is allowed and making the predetermined deal based on the point deal request only when the deal is allowed; and
point change means for changing a number of points of a user which is kept track of in the customer information database when a change to the number of points of the user occurs due to the predetermined deal made by said deal making means.

14. A trade service device for connection to a point service provider server for keeping track of a number of points on a customer basis in a customer information database and a user terminal over a network for offering point services in accordance with a number of points possessed by a customer, the trade service device comprising:
a trading rate database for keeping track of a trading rate between point services on a point service provider basis;
deal request reception means for receiving a point deal request including a point trading request from the user terminal;
deal making means for making a predetermined deal based on the point deal request by calculating a number of points to be acquired based on the trading rate, and the point trade request received by said deal request reception means, and carrying out point trading; and
point change means for changing a number of points of a user which is kept track of in the customer information database when a change to the number of points of the user occurs due to the predetermined deal made by said deal making means as a result of the point trading.

15. A point service method for offering various point services over a network in accordance with a number of points possessed by a customer, the point service method comprising:
keeping track of a number of points on a customer basis in a customer information database;
receiving a point deal request including a point trading condition from a user terminal;
keeping track of the point trading condition in a trading condition tracking database for point trading;
making a predetermined deal between users based on the point deal request by searching the trading condition tracking database to find any point trading condition corresponding to the point trading condition received in said receiving operation for point trading; and
changing a number of points of a user which is kept track of in the customer information database when a change to the number of points of the user occurs due to the predetermined deal between users made by said making of the predetermined deal.

16. A point service method for offering various point services over a network in accordance with a number of points possessed by a customer, the point service method comprising:

keeping track of a point cash rate in a cash rate database including information about an expiration date of the point cash rate on a point service provider basis;

keeping track of a number of points on a customer basis in a customer information database;

receiving a point deal request including cash information from a user terminal;

making a predetermined deal based on the point deal request by calculating a cash amount based on the cash information received by said receiving of the point deal request, and the point cash rate, and making a payment based on the cash amount; and changing a number of points of a user which is kept track of in the customer information database when a change to the number of points of the user occurs due to the predetermined deal made by said making of the predetermined deal as a result of the calculation performed by said making of the predetermined deal, wherein the point cash rate varies over time and is set in consideration of a number of days left to the expiration date.

17. A point service method for offering various point services over a network in accordance with a number of points possessed by a customer, the point service method comprising:

keeping track of restriction information which defines whether or not a predetermined deal including at least one of point trading and cashing in of points is allowed in a restriction information database on a point service provider basis;

keeping track of a number of points on a customer basis in a customer information database;

receiving a point deal request from a user terminal;

determining, based on the restriction information, whether or not a deal relating to the point deal request received by said receiving of the point deal request is allowed and making the predetermined deal based on the point deal request only when the deal is allowed; and changing a number of points of a user which is kept track of in the customer information database when a change to the number of points of the user occurs due to the predetermined deal made by said making of the predetermined deal.

18. A point service method for offering various point services over a network in accordance with a number of points possessed by a customer, the point service method comprising:

keeping track of a trading rate for point services in a trading rate database on a point service provider basis;

keeping track of a number of points on a customer basis in a customer information database;

receiving a point deal request including a point trading request from a user terminal;

making a predetermined deal based on the point deal request by calculating a number of points to be acquired based on the trading rate, and the point trading request received by said receiving of the point deal request, and carrying out point trading; and changing a number of points of a user which is kept track of in the customer information database when a change to the number of points of the user occurs due to the predetermined deal made by said making of the predetermined deal as a result of the point trading.

19. A trade service device for connection to a point service provider server for keeping track of a number of points on a customer basis in a customer information database and a user terminal over a network for offering point services in accordance with a number of points possessed by a customer, the trade service device comprising:

a cash rate database for keeping track of a point cash rate and including information about popularity of points on a point service provider basis;

deal request reception means for receiving a point deal request including cash information from the user terminal;

deal making means for making a predetermined deal based on the point deal request by calculating a cash amount based on the cash information received by said deal request reception means, and the point cash rate, and making a payment based on the cash amount; and point change means for changing a number of points of a user which is kept track of in the customer information database when a change to the number of points of the user occurs due to the predetermined deal made by said deal making means as a result of the calculation performed by said deal making means, wherein the point cash rate varies over time and is set in consideration of the popularity of points.

20. A point service method for offering various point services over a network in accordance with a number of points possessed by a customer, the point service method comprising:

keeping track of a point cash rate in a cash rate database including information about popularity of points on a point service provider basis;

keeping track of a number of points on a customer basis in a customer information database;

receiving a point deal request including cash information from a user terminal;

making a predetermined deal based on the point deal request by calculating a cash amount based on the cash information received by said receiving of the point deal request, and the point cash rate, and making a payment based on the cash amount; and changing a number of points of a user which is kept track of in the customer information database when a change to the number of points of the user occurs due to the predetermined deal made by said making of the predetermined deal as a result of the calculation performed by said making of the predetermined deal, wherein the point cash rate varies over time and is set in consideration of the popularity of points.

* * * * *

UNITED STATES PATENT AND TRADEMARK OFFICE
CERTIFICATE OF CORRECTION

| | |
|---|---|
| PATENT NO. | : 7,124,109 B2 |
| APPLICATION NO. | : 09/984806 |
| DATED | : October 17, 2006 |
| INVENTOR(S) | : Kiyomi Sakamoto et al. |

Page 1 of 1

It is certified that error appears in the above-identified patent and that said Letters Patent is hereby corrected as shown below:

ON THE TITLE PAGE

In the abstract, line 8, please replace "provider servers, so that" with --provider servers so that--.

Signed and Sealed this

Sixth Day of February, 2007

JON W. DUDAS
*Director of the United States Patent and Trademark Office*